United States Patent
Kondo et al.

(10) Patent No.: US 12,473,097 B2
(45) Date of Patent: Nov. 18, 2025

(54) HYDROGEN AIRCRAFT

(71) Applicant: KAWASAKI JUKOGYO KABUSHIKI KAISHA, Kobe (JP)

(72) Inventors: Yoshitaka Kondo, Kobe (JP); Takahiro Toyoda, Kobe (JP); Takeshi Nakagawa, Kobe (JP); Kenta Kumada, Kobe (JP); Yosuke Ueno, Kobe (JP); Kazuki Nomura, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/645,409

(22) Filed: Apr. 25, 2024

(65) Prior Publication Data

US 2024/0270401 A1    Aug. 15, 2024

Related U.S. Application Data

(63) Continuation of application No. PCT/JP2022/040477, filed on Oct. 28, 2022.

(30) Foreign Application Priority Data

Oct. 29, 2021  (JP) .................................. 2021-177445

(51) Int. Cl.
  *B64D 37/30*    (2006.01)
  *B64C 1/10*    (2006.01)
  *B64D 37/04*    (2006.01)

(52) U.S. Cl.
  CPC ............. *B64D 37/30* (2013.01); *B64D 37/04* (2013.01); *B64C 1/10* (2013.01)

(58) Field of Classification Search
  CPC ....... B64C 1/22; B64C 1/1415; B64C 1/0685; B64D 37/04; B64D 37/30
  See application file for complete search history.

(56) References Cited

U.S. PATENT DOCUMENTS 2,977,077 A * 3/1961 Pearson ................ B64C 1/1415
  292/144
3,055,620 A * 9/1962 Weiland ................ B64C 1/1415
  292/341.15

(Continued)

FOREIGN PATENT DOCUMENTS

EP    4124568 A1 * 2/2023 ............. B64C 17/00
JP    2005280698 A    10/2005

(Continued)

OTHER PUBLICATIONS

DE 102020007826 A1 and translation (Year: 2022).*

(Continued)

*Primary Examiner* — Philip J Bonzell
*Assistant Examiner* — Michael B. Kreiner
(74) *Attorney, Agent, or Firm* — XSENSUS LLP (57) ABSTRACT

A hydrogen aircraft includes: an airframe including a fuselage and a wing; at least one propulsion system fixed to the airframe; a pressurized chamber disposed inside the fuselage; a pressure bulkhead that is disposed at a rear part of the pressurized chamber and has strength to withstand pressurization of the pressurized chamber; a hydrogen tank that is disposed in an accommodation section and stores liquid hydrogen, the accommodation section being installed behind the pressure bulkhead, outside the pressurized chamber, and inside the fuselage; and a supply line that supplies the liquid hydrogen stored in the hydrogen tank to the propulsion system.

4 Claims, 11 Drawing Sheets

(56) References Cited

U.S. PATENT DOCUMENTS

| | | | |
|---|---|---|---|
| 6,119,985 A | 9/2000 | Clapp et al. | |
| 8,523,105 B2* | 9/2013 | Buchheit | H01M 8/04208 |
| | | | 244/119 |
| 10,604,229 B2* | 3/2020 | Lopez | B64C 1/22 |
| 10,800,525 B2* | 10/2020 | Sankrithi | B64C 30/00 |
| 11,525,544 B2* | 12/2022 | Clarke | F17C 1/00 |
| 11,820,487 B2* | 11/2023 | Barmichev | B64F 5/00 |
| 12,208,913 B2* | 1/2025 | Linde | B64D 37/30 |
| 2008/0006743 A1 | 1/2008 | Miller et al. | |
| 2014/0339367 A1* | 11/2014 | Sankrithi | B64D 37/30 |
| | | | 244/135 R |
| 2015/0336680 A1 | 11/2015 | Schumacher et al. | |
| 2017/0066518 A1* | 3/2017 | Gallant | B64D 29/06 |
| 2021/0381429 A1* | 12/2021 | Taylor | B64D 37/30 |
| 2022/0227497 A1 | 7/2022 | Dean | |
| 2022/0388626 A1* | 12/2022 | Alonso Tabares | B64D 9/00 |
| 2023/0348081 A1* | 11/2023 | Riediger | B64D 27/12 |

FOREIGN PATENT DOCUMENTS

| | | |
|---|---|---|
| WO | 98/39207 A1 | 9/1998 |
| WO | 2020/079419 A1 | 4/2020 |

OTHER PUBLICATIONS

ES 2933078 A1 and translation (Year: 2021).*
Extended European Search Report issued Nov. 27, 2024 in European Patent Application No. 22887195.0, 8 pages.

* cited by examiner

HYDROGEN AIRCRAFT

CROSS-REFERENCE TO RELATED APPLICATIONS

The present application claims priority to PCT/JP2022/040477 filed Oct. 28, 2022, and JP 2021-177445 filed Oct. 29, 2021, both of which are incorporated herein by reference.

FIELD OF INVENTION

The present disclosure relates to a hydrogen aircraft using liquid hydrogen as an energy source.

BACKGROUND ART

A hydrogen aircraft that flies using liquid hydrogen as an energy source is known. A hydrogen aircraft needs to mount a hydrogen tank for storing liquid hydrogen, on the airframe.

The hydrogen tank for storing liquid hydrogen needs to be subjected to various kinds of maintenance. In addition, since the hydrogen tank stores cryogenic liquid hydrogen, excellent thermal insulation properties are required so as not to generate boil-off gas (BOG) as much as possible.

SUMMARY

A hydrogen aircraft according to one aspect of the present disclosure includes: an airframe including a fuselage and a wing; at least one propulsion system fixed to the airframe; a pressurized chamber disposed inside the fuselage; a pressure bulkhead that is disposed at a rear part of the pressurized chamber and has strength to withstand pressurization of the pressurized chamber; a hydrogen tank that is disposed in an accommodation section and stores liquid hydrogen, the accommodation section being installed behind the pressure bulkhead, outside the pressurized chamber, and inside the fuselage; and a supply line that supplies the liquid hydrogen stored in the hydrogen tank to the propulsion system.

DETAILED DESCRIPTION

Hereinafter, various embodiments of a hydrogen aircraft according to the present disclosure will be described in detail with reference to the drawings. A hydrogen aircraft of the present disclosure can be applied to various aircrafts that include an airframe having a fuselage and a wing and at least one propulsion system fixed to the airframe and that fly using liquid hydrogen as an energy source. The airframe may be used for any of passengers and cargo as long as the airframe includes a pressurized chamber. There is no limitation in the propulsion system as long as the propulsion system uses liquid hydrogen as an energy source, and examples of the propulsion system include a hydrogen combustion gas turbine engine, an electric propulsion device including a combination of a fuel cell and an electric motor, and a hybrid propulsion device including the gas turbine engine and the electric propulsion device. Hereinafter, specific embodiments of the hydrogen aircraft according to the present disclosure will be described.

First Embodiment

Figure 1:
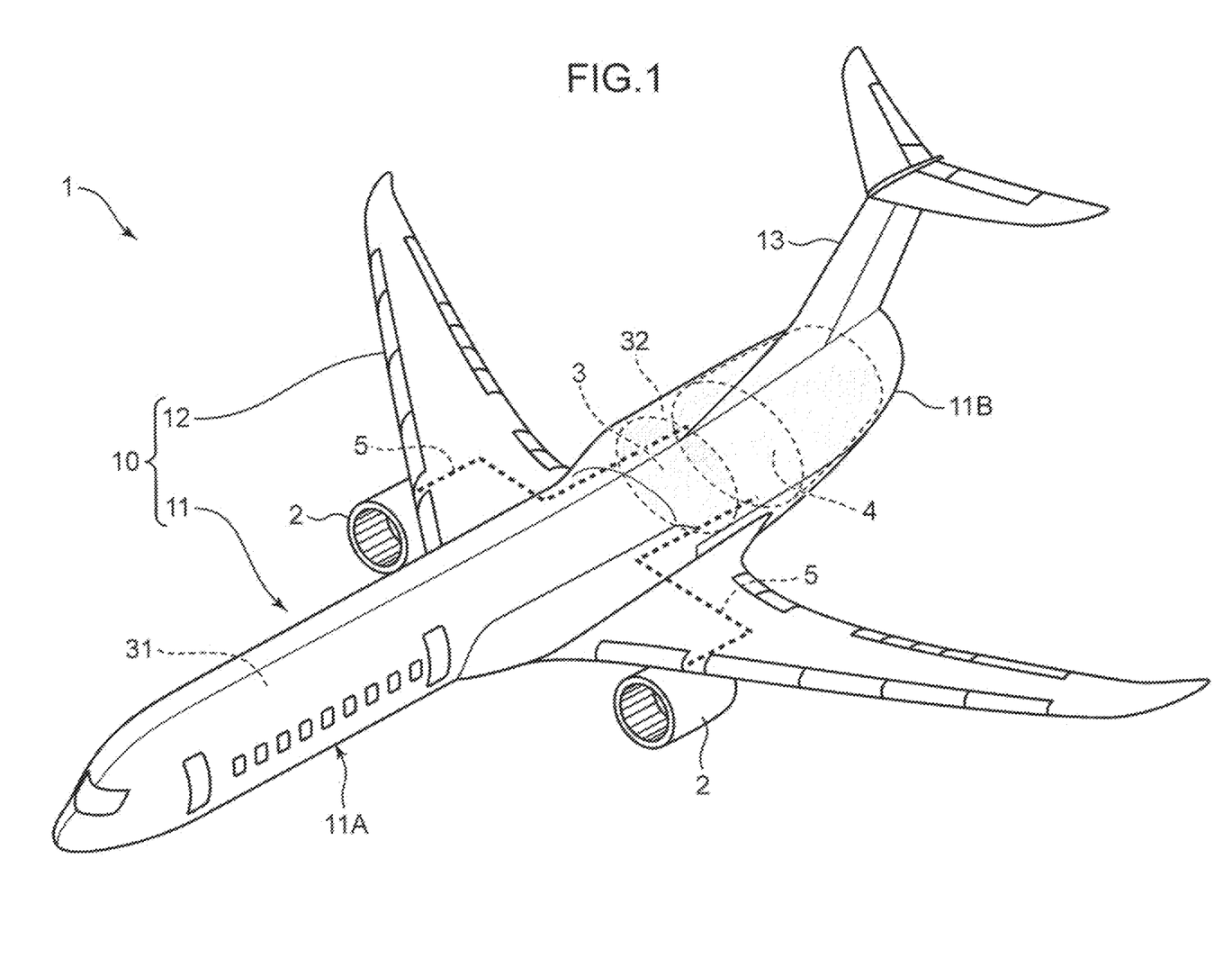
FIG. 1 is a perspective view illustrating a hydrogen aircraft according to a first embodiment of the present disclosure.

FIG. 1 is a perspective view illustrating a hydrogen aircraft 1 according to a first embodiment of the present disclosure. The hydrogen aircraft 1 includes an airframe 10, engines 2, a pressure bulkhead 3, a hydrogen tank 4, and supply lines 5. The engines 2 corresponds to the propulsion system.

The airframe 10 includes a fuselage 11, a pair of left and right main wings 12, and an empennage 13. The fuselage 11 includes structural members such as circular frames and stringers, and a fuselage panel assembled in a cylindrical shape. The pair of main wings 12 include spars and flaps, and each extend laterally right or left from the fuselage 11. The empennage 13 is positioned at a rear end part of the fuselage 11 and is configured with a vertical empennage and horizontal empennages. In the airframe 10 of the present embodiment, the empennage is shown as a T-shaped empennage, but may be an empennage in a form other than a T shape may be used. The engines 2 are, for example, hydrogen combustion gas turbine engines using liquid hydrogen as fuel. The engines 2 are each fixed one of the pair of main wings 12.

The fuselage 11 includes: a front fuselage 11A on the side from the front to the center in the fuselage axis direction; and a rear fuselage 11B on the rear side. Roughly speaking, the front fuselage 11A is a pressurized zone, and the rear fuselage 11B is a non-pressurized zone. Inside the front fuselage 11A there is disposed a pressurized chamber 31. The pressurized chamber 31 is pressurized so that the pressurized chamber 31 can be kept in a state close to the ground pressure even when the hydrogen aircraft 1 is in flight. The pressurized chamber 31 is a space serving as a passenger compartment or a cargo compartment.

The pressure bulkhead 3 is disposed on a rear part of the pressurized chamber 31. The pressure bulkhead 3 has strength to withstand the pressurization of the pressurized chamber 31. A non-pressurized accommodation section 32 is installed inside the rear fuselage 11B that is located outside the pressurized chamber 31 and behind the pressure bulkhead 3. That is, the pressure bulkhead 3 is a partition wall that partitions between the pressurized zone and the non-pressurized zone. The accommodation section 32 is a substantially cylindrical space using an internal space of the rear fuselage 11B.

The hydrogen tank 4 is a tank that stores liquid hydrogen serving as fuel for the engines 2, and is disposed in the accommodation section 32. FIG. 1 illustrates an example in which one hydrogen tank 4 is accommodated in the accommodation section 32. The hydrogen tank 4 desirably has a heat insulating structure in order to reduce a temperature rise of stored liquid hydrogen.

The supply lines 5 are pipes connecting the hydrogen tank 4 in the accommodation section 32 and the engines 2 fixed to the main wings 12. The liquid hydrogen stored in the hydrogen tank 4 is supplied, through the supply lines 5, to the engines 2 each disposed on one of the pair of main wings 12. The supply lines 5 are each desirably a pipe having a heat insulating structure such as a vacuum double tube in order to reduce a temperature rise of liquefied hydrogen. On the supply lines 5 there is installed equipment such as pumps for feeding liquid hydrogen.

According to the hydrogen aircraft 1 of the first embodiment, the hydrogen tank 4 is disposed in the accommodation section 32 installed in the fuselage 11 and behind the pressure bulkhead 3. In other words, the hydrogen tank 4 is disposed in the accommodation section 32, which is in the rear fuselage 11B. The accommodation section 32 is a non-pressurized space isolated from the pressurized chamber 31 of the front fuselage 11A by the pressure bulkhead 3. Therefore, the degree of freedom of maintenance of the hydrogen tank 4 is improved. That is, a seal structure for the pressurization is omitted for the non-pressurized space as compared with the pressurized space; therefore, it is possible to simplify the work for accessing the hydrogen tank 4 and attaching and detaching the hydrogen tank 4. Therefore, it is possible to reduce the time and effort required for maintenance work. In addition, since the accommodation section 32 is isolated from the pressurized chamber 31, which serves as a passenger compartment, even if liquid hydrogen leaks from the hydrogen tank 4, the safety of the pressurized chamber 31 can be secured easily. Furthermore, since the accommodation section 32 is disposed behind the pressure bulkhead 3 disposed at the rear part of the pressurized chamber 31, in other words, is disposed in the rear fuselage 11B; unlike the case where the accommodation section 32 is disposed in the front fuselage 11A, the pressurized chamber 31 is not divided in the fuselage axis direction.

In addition, the hydrogen tank 4 is disposed in the accommodation section 32, which is an internal space of the rear fuselage 11B. Therefore, it is easy to secure a large tank capacity without increasing the cross-sectional area of the fuselage 11. If a form is adopted in which a plurality of hydrogen tanks are provided on the outer periphery of the fuselage 11, the cross-sectional area of the fuselage 11 including the hydrogen tanks needs to be increased, or the cross-sectional area of the pressurized chamber 31 needs to be reduced. In addition, it is necessary to adopt a form in which a hydrogen tank is elongated in the fuselage axis direction, and a plurality of tanks need to be disposed in parallel to increase a total tank capacity. However, with the present embodiment, it is not necessary to adopt a form in which the hydrogen tank 4 is elongated in the fuselage axis direction, and the hydrogen tank 4 can be made to have a tank shape closer to a spherical shape and can be incorporated in the accommodation section 32. When the hydrogen tank 4 is made to be a spherical tank, the ratio of the tank surface area to the tank volume can be reduced while securing the tank capacity, so that the thermal insulation properties can be easily improved. That is, as the tank surface area increases, the area of heat exchange with the surrounding environment increases, thereby inducing BOG; however, when the spheroidization of the hydrogen tank 4 can suppress the BOG. From the above points, with the first embodiment, it is possible to provide the hydrogen aircraft 1 including the hydrogen tank 4 having excellent maintainability and excellent thermal insulation properties.

Second Embodiment

Figure 2:
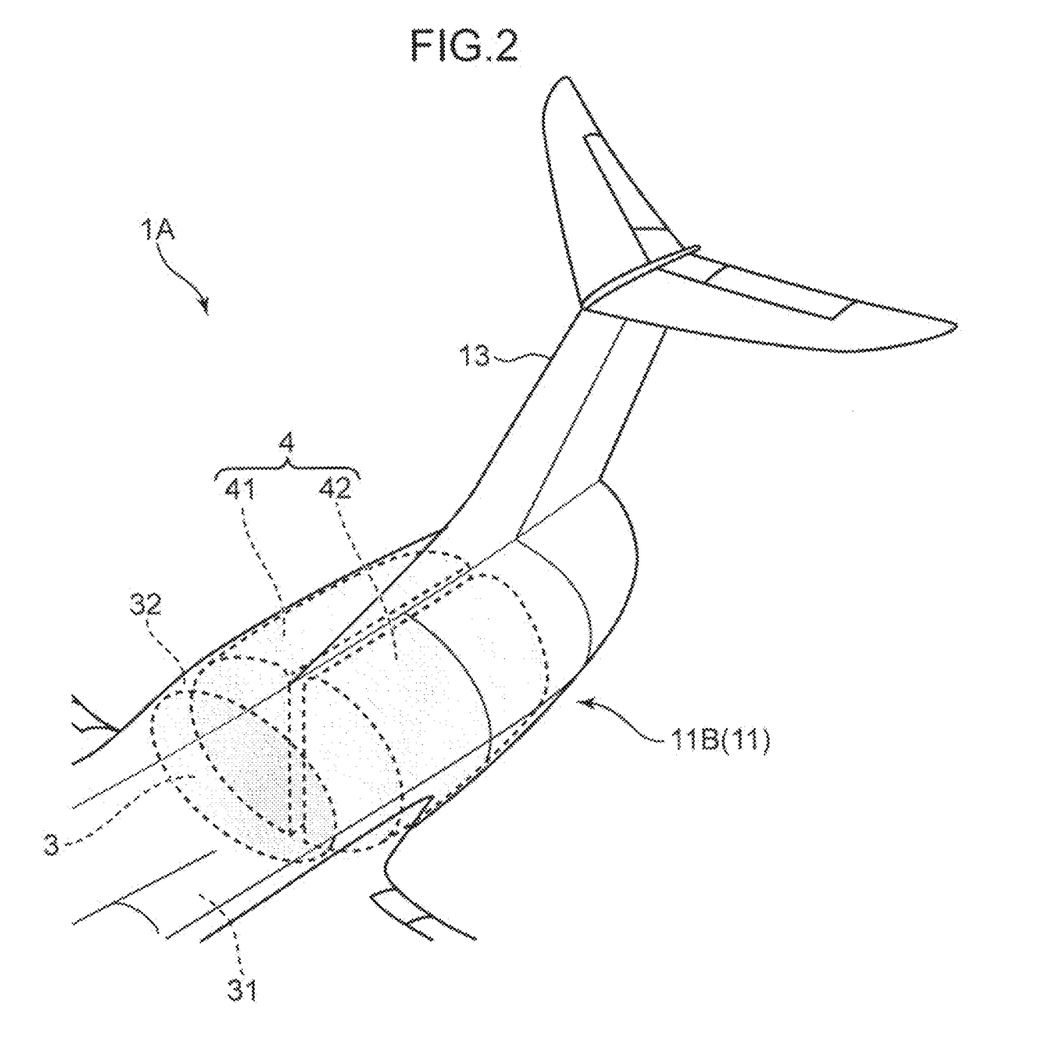
FIG. 2 is a perspective view illustrating a main part of a hydrogen aircraft according to a second embodiment.

FIG. 2 is a perspective view illustrating a rear fuselage 11B of a fuselage 11 of a hydrogen aircraft 1A according to the second embodiment. In an accommodation section 32 of the rear fuselage 11B, a hydrogen tank 4 is disposed to be divided into two parts of a first hydrogen tank 41 and a second hydrogen tank 42. The first hydrogen tank 41 and the second hydrogen tank 42 are tanks for storing liquid hydrogen and each have a heat insulating structure.

The first hydrogen tank 41 and the second hydrogen tank 42 are disposed on the left and right sides of the accommodation section 32 with the fuselage axis of the fuselage 11 sandwiched therebetween. Since the rear fuselage 11B has a substantially circular cross-sectional shape, the first hydrogen tank 41 and the second hydrogen tank 42 have a shape of such an approximately semi-cylindrical body that is made by dividing a cylindrical body into halves. Of course, the hydrogen tanks 41 and 42 may be made to have a shape closer to a spherical shape, but, from the viewpoint of maximally utilizing the capacity of the accommodation section 32, the shape of a semi-cylindrical body is desirable. The hydrogen aircraft 1A according to the second embodiment includes supply lines for supplying liquid hydrogen from the hydrogen tank 4 to the engines 2 are provided similarly to FIG. 1. The supply lines may be made such that the first hydrogen tank 41 and the second hydrogen tank 42 are individually connected to the engine 2 of one of the main wings 12 and the engine 2 of the other of the main wings 12 or such that liquid hydrogen can be supplied from both hydrogen tanks 41 and 42 to any one of the engines 2.

Figure 3:
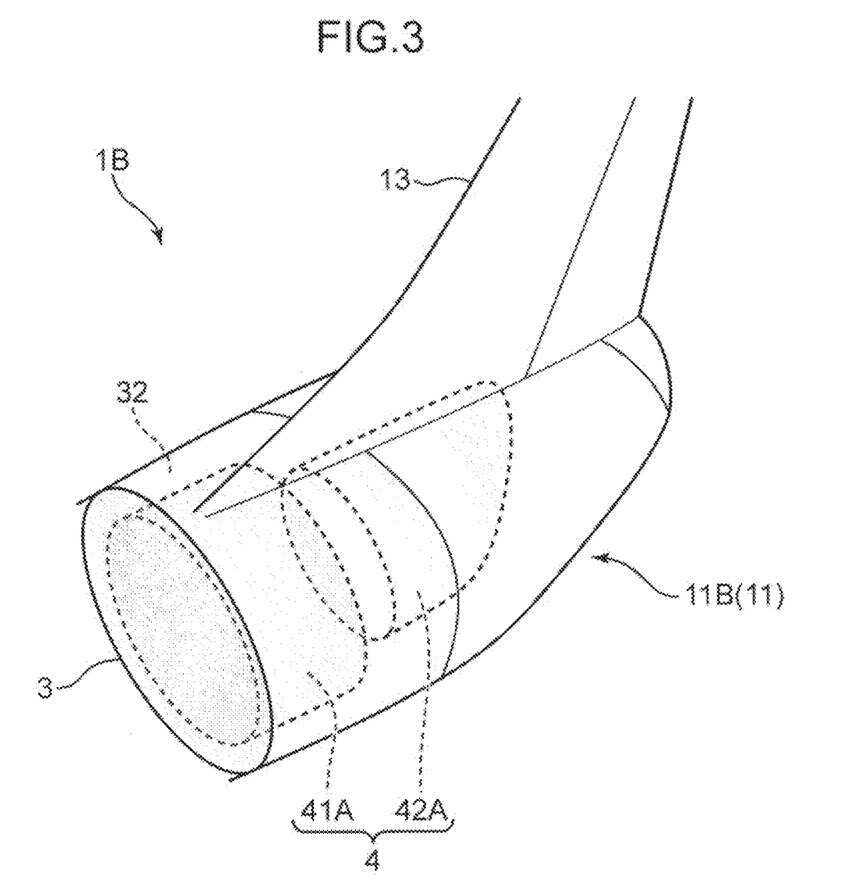
FIG. 3 is a perspective view illustrating a main part of a hydrogen aircraft according to a modification of the second embodiment.

FIG. 3 is a perspective view illustrating a rear fuselage 11B of a hydrogen aircraft 1B according to a modification of the second embodiment. The hydrogen tank 4 of the hydrogen aircraft 1B is configured with a first hydrogen tank 41A and a second hydrogen tank 42A that are disposed in line in the front-rear direction of the fuselage 11. Each of the first hydrogen tank 41A and the second hydrogen tank 42A has a substantially cylindrical shape. Since the cross-sectional area of the rear fuselage 11B, in other words, the cross-sectional area of the accommodation section 32 becomes smaller toward the rear end of the fuselage 11, the second hydrogen tank 42A made to have a size having a smaller cylindrical diameter than that of the first hydrogen tank 41A. Supply lines for supplying liquid hydrogen to the engines 2 are provided also from the hydrogen tanks 41A and 42A.

Although FIGS. 2 and 3 illustrate examples in which the hydrogen tank 4 is divided into two, the hydrogen tank 4 may be configured with three or more divided tanks. For example, in the hydrogen aircraft 1A of FIG. 2, the following form may be adopted. The first hydrogen tank 41 and the second hydrogen tank 42 are each divided in the circumferential direction into two parts, and four fan-shaped tanks are arranged in the accommodation section 32. Alternatively, both hydrogen tanks 41 and 42 may be further divided in the fuselage axis direction. Furthermore, in the hydrogen aircraft 1B in FIG. 3, a form may be adopted in which the hydrogen tank 4 is configured such that three or more divided tanks are arranged in the fuselage axis direction. Alternatively, at least one of the first hydrogen tank 41A and the second hydrogen tank 42A may be further divided into two halves as in the example of FIG. 2. Note that, under the requirement of aircraft safety, one or more tanks need to be provided for one engine, and the number of tanks is set in consideration of the requirement.

According to the second embodiment, since the hydrogen tank 4 is divided into at least two parts, the disposition form of the hydrogen tank 4 in the accommodation section 32 can be diversified. Therefore, a large tank capacity can be secured by efficiently using the space of the accommodation section 32. Furthermore, by dividing the hydrogen tank 4, it is easy to attach and detach the hydrogen tank 4 to and from the accommodation section 32, and maintainability can be improved.

Third Embodiment

Figure 4A:
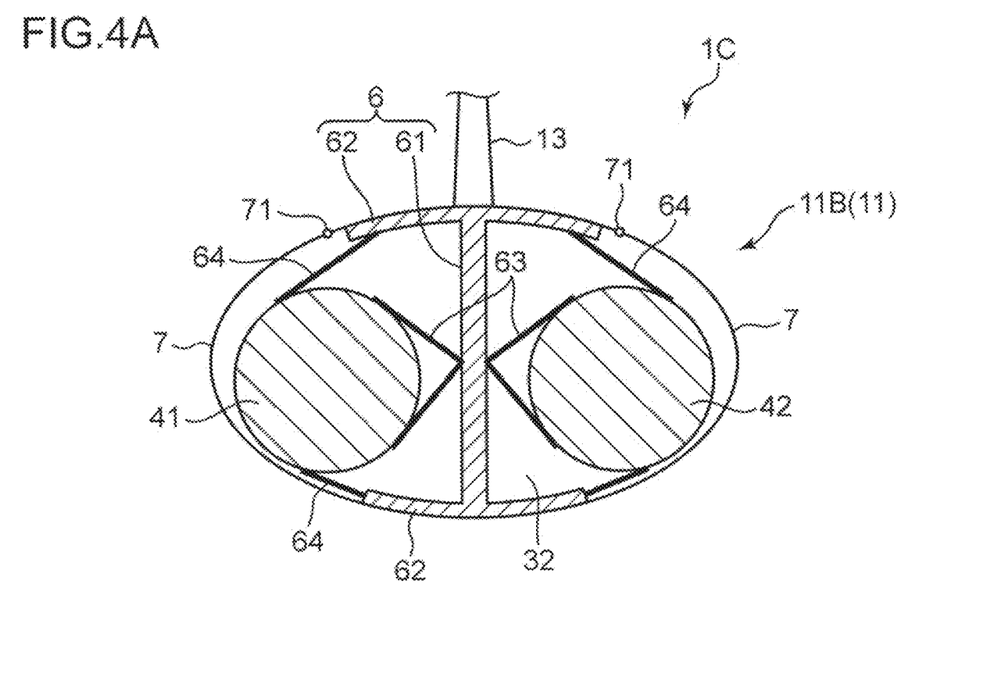
FIG. 4A is a cross-sectional view of a main part of a hydrogen aircraft according to a third embodiment.

FIG. 4A is a cross-sectional view of a main part of a hydrogen aircraft 1C according to a third embodiment. The third embodiment describes an embodiment in which the second embodiment in FIG. 2 is further specified. The hydrogen aircraft 1C also includes a first hydrogen tank 41 and a second hydrogen tank 42 that are disposed separately on the left and right sides of the accommodation section 32. The hydrogen aircraft 1C includes an attachment and detachment mechanism that enables attachment and detachment of the first hydrogen tank 41 and the second hydrogen tank 42 to and from the accommodation section 32.

The fuselage frame member 6 including a vertical structural member 61 and fuselage frames 62 is provided in a rear fuselage 11B of a fuselage 11 of the hydrogen aircraft 1C. The vertical structural member 61 is a plate-shaped high-rigidity member that is disposed directly below the empennage 13 and supports the empennage 13. The vertical structural member 61 vertically penetrates the accommodation section 32 at the center of the rear fuselage 11B in the airframe width direction, and functions to transmit the load of the empennage 13 to a structural member of the fuselage 11. The fuselage frames 62 are arcuate frame members attached to the upper and lower ends of the vertical structural member 61. A plurality of fuselage frames 62 are attached to the plate-shaped vertical structural member 61 at a predetermined pitch.

The outer periphery of the fuselage frame member 6 is covered with fairings 7 that rectify an air flow. A space covered with the fairings 7 in the rear fuselage 11B is the accommodation section 32. The accommodation section 32 is divided into two side chambers on the left and right sides by being partitioned by the vertical structural member 61. A first hydrogen tank 41 is accommodated in one side chamber, and a second hydrogen tank 42 is accommodated in the other side chamber. The first hydrogen tank 41 and the second hydrogen tank 42 are supported by inner holders 63 and outer holders 64 so as to be sandwiched therebetween. The inner holders 63 extend from the vertical structural member 61 and support the inner side surfaces of the hydrogen tanks 41 and 42. The outer holders 64 extends from the fuselage frames 62 and support the outer side surfaces of the hydrogen tanks 41 and 42.

The hydrogen aircraft 1C includes, as the attachment and detachment mechanism, a mechanism that allows a part of a peripheral wall of the rear fuselage 11B to be opened and exposes the accommodation section 32 to the outside. Specifically, a structure for rotating parts of the fairings 7 is provided. No fuselage frame member 6 is disposed on the left and right sides of the rear fuselage 11B. That is, the fuselage frames 62 on the upper side and the fuselage frames 62 on the lower side are not connected on any of both sides, and the left and right sides of the rear fuselage 11B are therefore covered only with the fairings 7. The fairings 7 have turning fulcrums 71 near both ends of the fuselage frames 62 on the upper side. The fairings 7 covering the left and right sides are rotatable about the turning fulcrums 71.

Figure 4B:
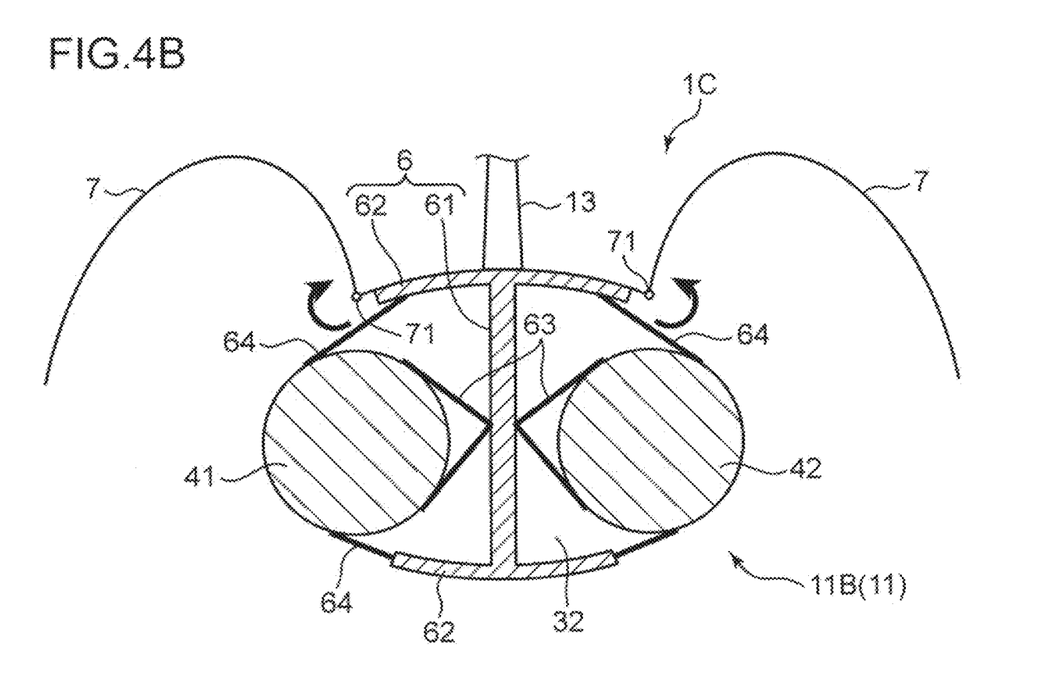
FIG. 4B is a cross-sectional view illustrating a state where fairings are opened in the hydrogen aircraft of the third embodiment.

FIG. 4B is a cross-sectional view illustrating a state where the fairings 7 are opened in the hydrogen aircraft 1C of the third embodiment. The left and right fairings 7 are turned about the turning fulcrums 71 and are opened in a wing shape. The accommodation section 32 is opened to the outside by the turning of the fairings 7, and the hydrogen tanks 41 and 42 are largely exposed. Therefore, a worker can access the hydrogen tanks 41 and 42 only by turning the fairings 7. Furthermore, the worker can take out the hydrogen tanks 41 and 42 from the accommodation section 32 by releasing the holding state by the holders 63 and 64. In addition, the worker can easily mount new hydrogen tanks 41 and 42 or the hydrogen tanks 41 and 42 after maintenance, in the accommodation section 32. The attachment and detachment mechanism does not need to be a mechanism for turning the fairings 7, and may be a mechanism for making the fairings 7 detachable from the rear fuselage 11B.

With the hydrogen aircraft 1C of the third embodiment, the load acting on the vertical empennage 13 can be transmitted to the fuselage 11 through the vertical structural member 61 disposed to penetrate the accommodation section 32. Furthermore, although the accommodation section 32 is divided into the side chambers on the right and left sides by the disposition of the vertical structural member 61, the first hydrogen tank 41 and the second hydrogen tank 42 can be efficiently disposed using the side chambers. In addition, since the attachment and detachment mechanism is provided in which the fairings 7 are made rotatable and the accommodation section 32 can thereby be exposed to the outside, the accessibility to the hydrogen tanks 41 and 42 and the attachment and detachment of the hydrogen tanks 41 and 42 to and from the accommodation section 32 can be made easy, and maintainability can be improved.

Openings are formed in the fuselage 11 by turning the fairings 7, and a worker can access the hydrogen tanks 41 and 42 through the openings. The hydrogen aircraft 1C according to the third embodiment includes supply lines for supplying liquid hydrogen from the hydrogen tanks 41 and 42 to the engines 2 are provided similarly to FIG. 1. When the supply lines provided only at a place other than the openings formed in the fuselage 11 by turning the fairings 7, the maintainability can be further improved. The following position may be used as the installation place for the supply lines, for example. The positions such as the space above the lower fuselage frames 62 and below the upper fuselage frames 62, the positions not covering the parts, of the hydrogen tanks 41 and 42, to be exposed from the openings formed by opening the fairings 7. If the fairings 7 are referred to as access doors to the hydrogen tanks 41 and 42, the supply lines are provided only in a place other than between the access doors to the hydrogen tanks 41 and 42 provided in the fuselage 11 and the hydrogen tanks 41 and 42. As a result, since the supply lines do not become obstacles when the hydrogen tanks 41 and 42 are accessed, the maintainability of the hydrogen tanks 41 and 42 can be further improved.

Fourth Embodiment

Figure 5:
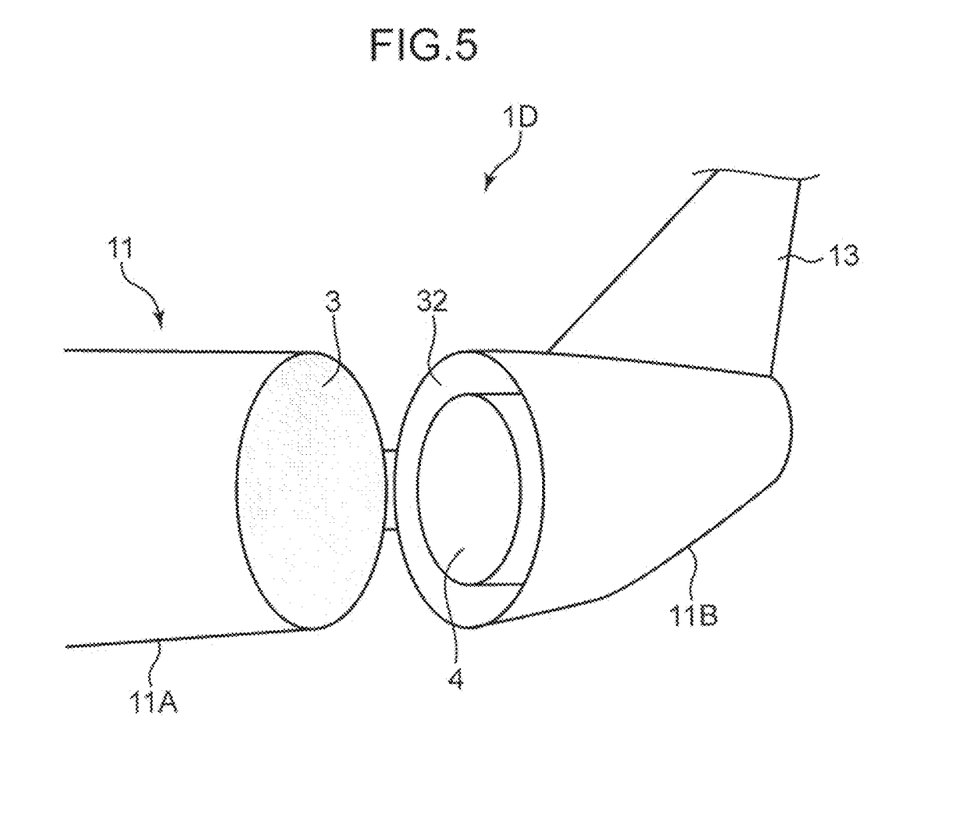
FIG. 5 is a perspective view illustrating a hydrogen aircraft according to a fourth embodiment in a state where the rear fuselage is swung.

FIG. 5 is a perspective view illustrating a hydrogen aircraft 1D according to a fourth embodiment. In the fourth embodiment, an example is described in which the attachment and detachment mechanism of the hydrogen tank 4 is realized by a so-called swing tail of a fuselage 11. FIG. 5 illustrates a state in which the rear fuselage 11B behind the pressure bulkhead of the fuselage 11 is swung with respect to the front fuselage 11A. The pressure bulkhead 3 seals a rear end surface of the front fuselage 11A. Due to the swing of the rear fuselage 11B, the accommodation section 32 is exposed, and a part of the hydrogen tank 4 in the accommodation section 32 is exposed. With the hydrogen aircraft 1D including such an attachment and detachment mechanism, since the hydrogen tank 4 can be exposed only by swinging the rear fuselage 11B, it is possible to facilitate the access of a worker to the hydrogen tank 4, removal of the hydrogen tank 4 from the accommodation section 32, assembly of the hydrogen tank 4 to the accommodation section 32, and the like.

By swinging the rear fuselage 11B, an opening is formed in the fuselage 11, and the worker can access the hydrogen tank 4 through the opening. The hydrogen aircraft 1D according to the fourth embodiment includes supply lines for supplying liquid hydrogen from the hydrogen tank 4 to the engines 2 are provided similarly to FIG. 1. The supply lines may be provided only in a place other than the opening formed in the fuselage 11 by swinging the rear fuselage 11B. As a result, the maintainability can be further improved. If the rear fuselage 11B is referred to as an access door to the hydrogen tank 4, when the supply lines are provided only in a place other than between the access door to the hydrogen tank 4 provided in the fuselage 11 and the hydrogen tank 4, the maintainability can be further improved. The installation place for the supply lines may be any position where the part, of the hydrogen tank 4, exposed from the opening formed by the swing of the rear fuselage 11B is not covered by the supply lines. However, the setting of the supply lines is not limited to the above.

Figure 6A:
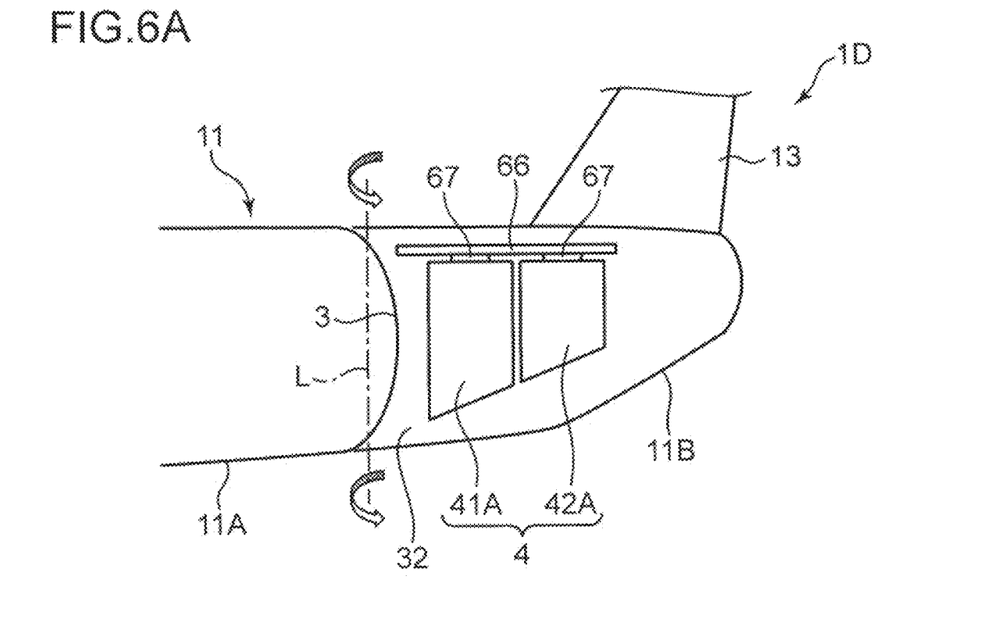
FIG. 6A is a cross-sectional view of a main part of a hydrogen aircraft according to the fourth embodiment taken along the fuselage axis direction.
Figure 6B:
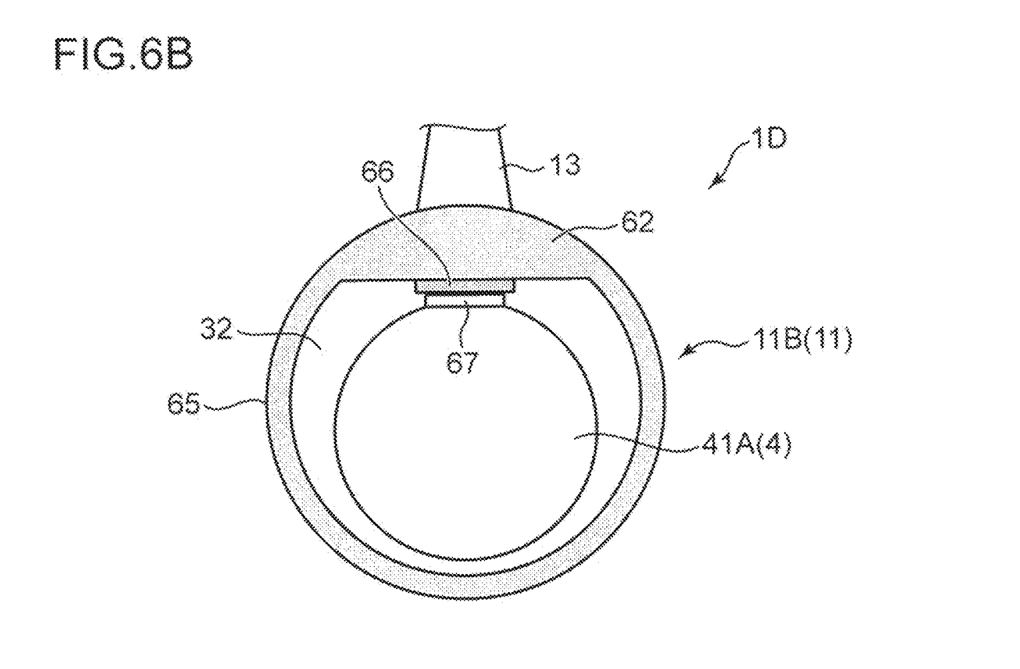
FIG. 6B is a cross-sectional view of the hydrogen aircraft of the fourth embodiment in a direction orthogonal to the fuselage axis direction.

Subsequently, a description will be given to a mechanism attached to facilitate attachment and detachment of the hydrogen tank 4 to and from the accommodation section 32 in the hydrogen aircraft 1D of the fourth embodiment. FIG. 6A is a cross-sectional view of a main part along the fuselage axis direction of the hydrogen aircraft 1D, and FIG. 6B is a cross-sectional view in a direction orthogonal to the fuselage axis direction. Similarly to the example of FIG. 3, the accommodation section 32 accommodates a hydrogen tank 4 including a first hydrogen tank 41A and a second hydrogen tank 42A disposed in line in the fuselage axis direction. The rear fuselage 11B is configured with: an aircraft body frame in which a plurality of fuselage frames 62 in a ring shape are coupled by longerons or stringers; and a skin 65 that covers an outer periphery of the aircraft body frame. The internal space of the skin 65 is the accommodation section 32 that accommodates the hydrogen tank 4.

The accommodation section 32 is equipped with a rail 66 for pulling out and accommodation of the hydrogen tank 4. The rail 66 is attached to an upper part of the fuselage frames 62 and extends in the fuselage axis direction. Sliders 67 engaged with the rail 66 are attached to the upper surfaces of the first hydrogen tank 41A and the second hydrogen tank 42A. The sliders 67 slide on the rail 66, whereby the first hydrogen tank 41A and the second hydrogen tank 42A slide can advance and retreat in the fuselage axis direction.

When the hydrogen tank 4 of the hydrogen aircraft 1D is subjected to maintenance, the rear fuselage 11B is first swung around a rotation axis L with respect to the front fuselage 11A to expose the accommodation section 32. Next, the first hydrogen tank 41A is slidingly moved forward and taken out from the front face opening of the accommodation section 32. Subsequently, the second hydrogen tank 42A is slidingly moved forward and taken out from the accommodation section 32 in the same manner. After the hydrogen tanks 41A and 42A are subjected to maintenance, the slider 67 of the second hydrogen tank 42A is engaged with the rail 66 and is moved backward, and the second hydrogen tank 42A is installed at a predetermined position of the accommodation section 32. Similarly, the first hydrogen tank 41A is also installed in the accommodation section 32. With this form, since the hydrogen tanks 41A and 42A can be easily moved in the front-rear direction along the rail 66, workability of maintenance can be remarkably facilitated.

Fifth Embodiment

Figure 7:
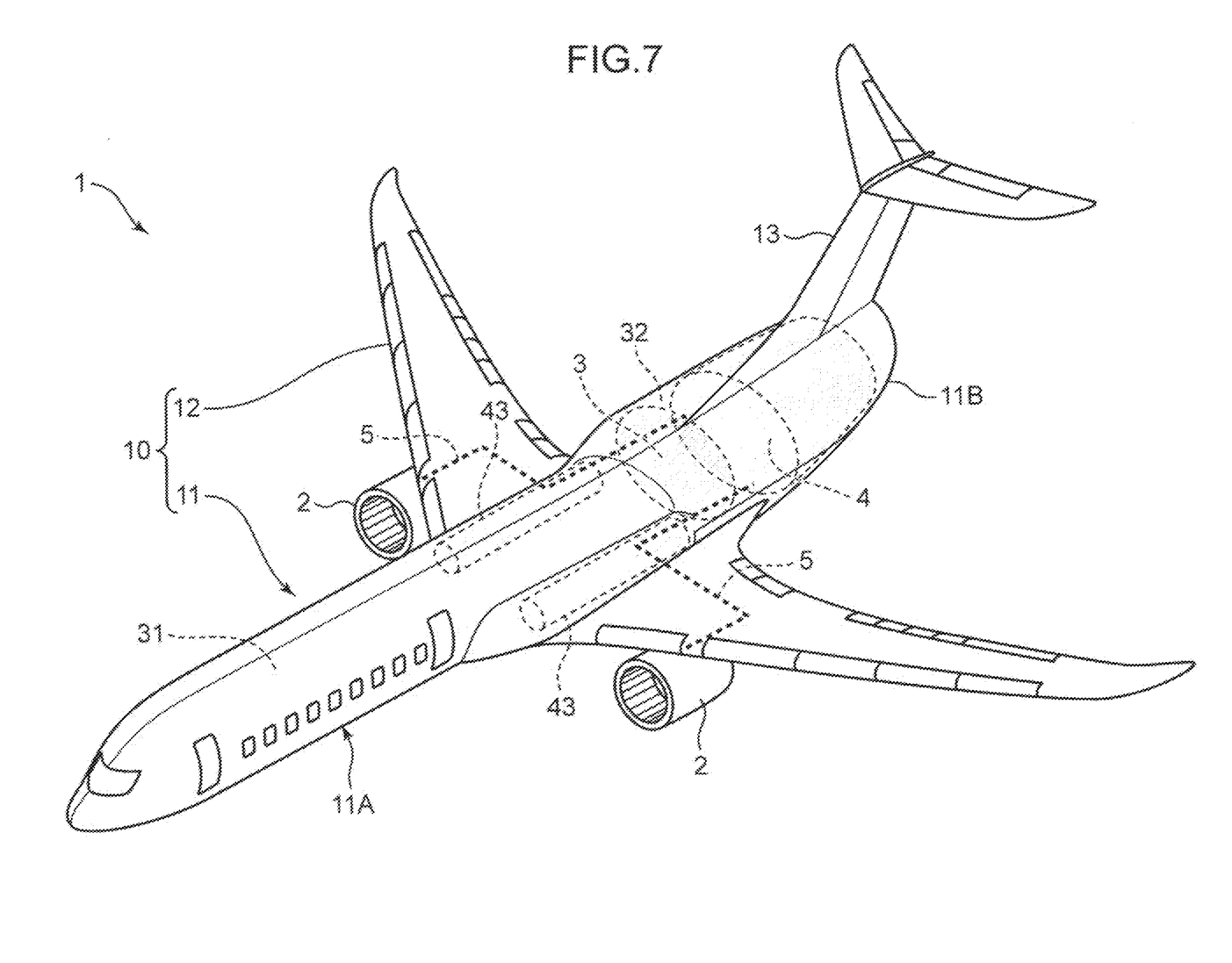
FIG. 7 is a perspective view illustrating a hydrogen aircraft according to a fifth embodiment.

FIG. 7 is a perspective view illustrating a hydrogen aircraft 1E according to the fifth embodiment. The fifth embodiment discloses an example in which, in addition to the hydrogen tank 4 disposed in the rear fuselage 11B behind the pressure bulkhead 3, a pair of sub hydrogen tanks 43 are disposed in the front fuselage 11A, which is ahead of the pressure bulkhead 3. The sub hydrogen tanks 43 are tanks capable of storing liquid hydrogen and have a cylindrical tank shape longer in the fuselage axis direction. Liquid hydrogen can be supplied to the engines 2 from both the hydrogen tank 4 and the sub hydrogen tanks 43.

The sub hydrogen tanks 43 are attached to both side parts of the front fuselage 11A and near the bases of the main wings 12. The sub hydrogen tanks 43 are disposed outside a peripheral wall defining the pressurized chamber 31, and peripheries of the sub hydrogen tanks 43 is covered with a fairing. The sub hydrogen tanks 43 and the engines 2 are connected by supply lines for liquid hydrogen. Since the sub hydrogen tanks 43 are disposed at positions close to the engines 2 attached under the wings of the main wings 12, lengths of transfer routes for transfer by the supply lines can be shortened. As a result, heat loss and a pipe weight of the supply lines can be reduced.

Figure 8:
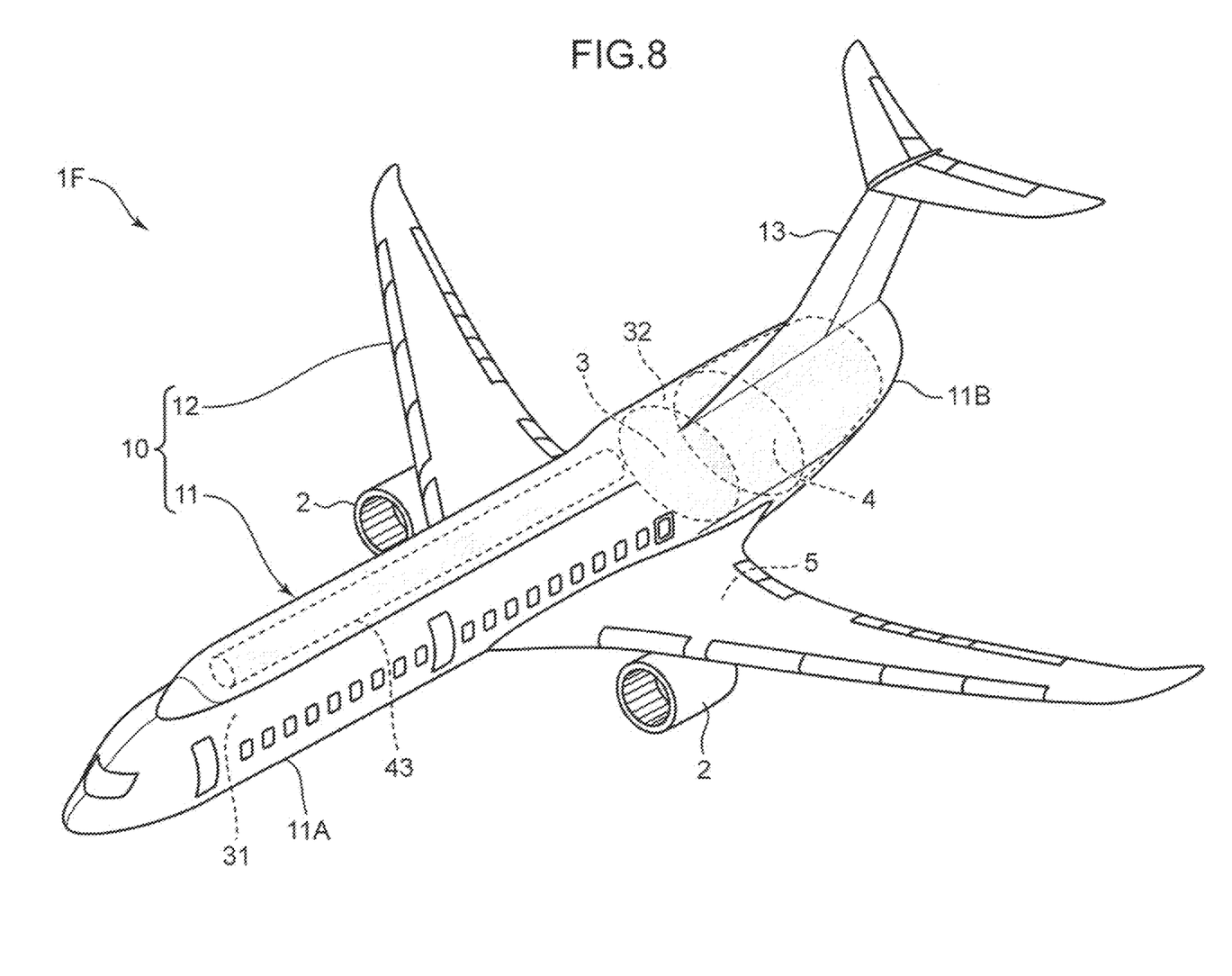
FIG. 8 is a perspective view illustrating a hydrogen aircraft according to a modification of the fifth embodiment.

FIG. 8 is a perspective view illustrating a hydrogen aircraft 1F according to a modification of the fifth embodiment. Also in the hydrogen aircraft 1F, in addition to the hydrogen tank 4 behind the pressure bulkhead 3, a cylindrical sub hydrogen tank 43 longer in the fuselage axis direction is disposed also ahead of the pressure bulkhead 3. Unlike the example of FIG. 7, the sub hydrogen tank 43 is attached outside the pressurized chamber 31 and above the front fuselage 11A. The sub hydrogen tank 43 has a length from slightly ahead of the pressure bulkhead 3 to slightly behind the cockpit. A periphery of the sub hydrogen tank 43 is covered with a fairing.

According to the fifth embodiment of FIG. 7 and the modification of FIG. 8, the hydrogen tank 4 is disposed behind the pressure bulkhead 3, and the sub hydrogen tank or tanks 43 are disposed ahead of the pressure bulkhead 3, so that the weight balance of the airframe 10 can be achieved. That is, the tank weight is not applied only to the rear fuselage 11B of the fuselage 11. In particular, according to the example of FIG. 7, a fuselage configuration is such that the plurality of hydrogen tanks 4 and 43 are disposed from the rear to the center in the fuselage axis direction. In this fuselage configuration, the hydrogen tanks 4 and 43 are disposed from the rear of the airframe to the vicinity of the airframe center of gravity, and it is possible to reduce the movement of the center of gravity while securing a tank volume and to easily establish airframe stability.

Sixth Embodiment

Figure 9:
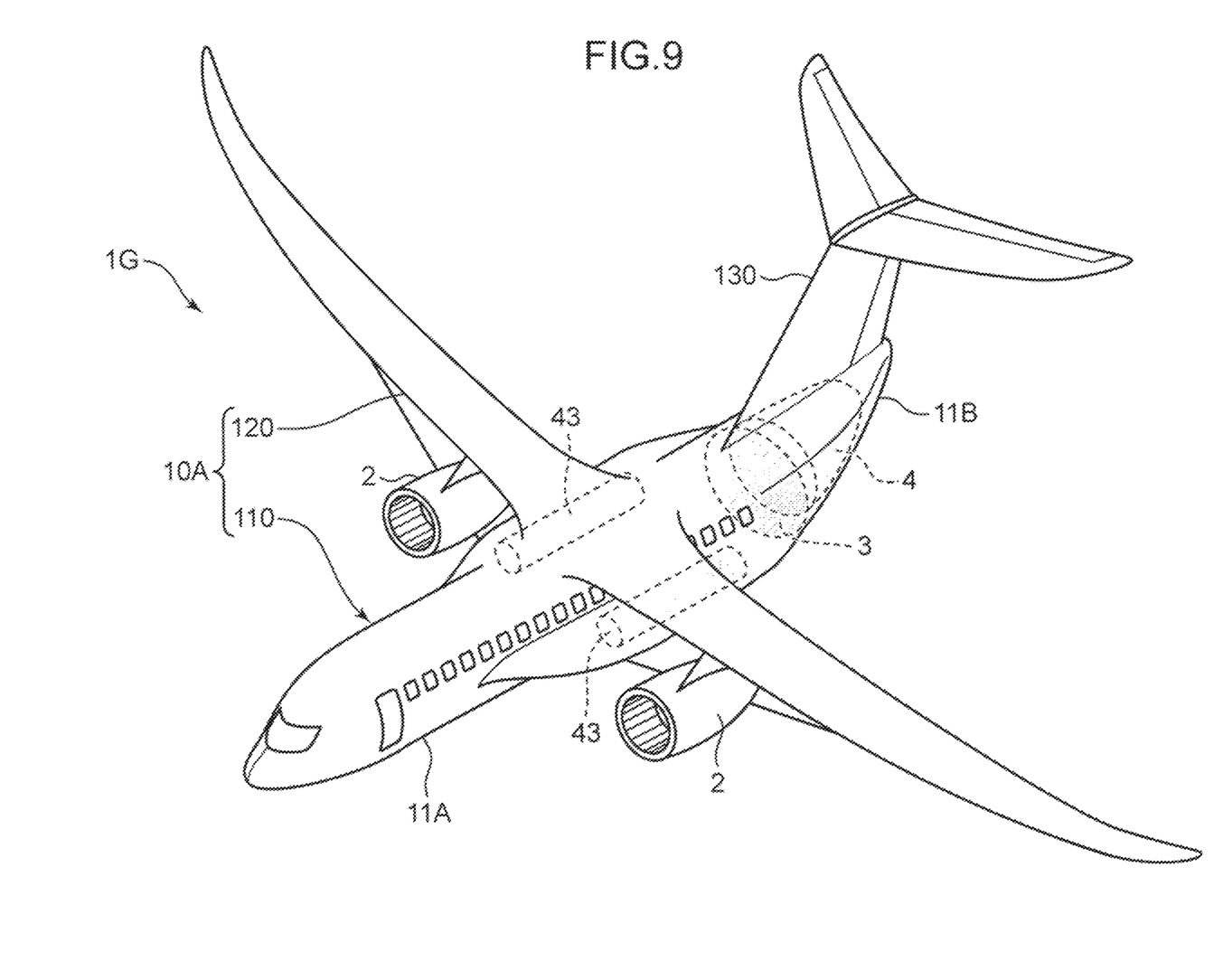
FIG. 9 is a perspective view illustrating a hydrogen aircraft according to a sixth embodiment.

FIG. 9 is a perspective view illustrating a hydrogen aircraft 1G according to a sixth embodiment. Unlike the hydrogen aircrafts exemplified above, the hydrogen aircraft 1G of the sixth embodiment includes an airframe 10A that has: a fuselage 110 and main wings 120 being of a high wing structure; and an empennage 130 having a T-shape. The hydrogen aircraft 1G also has: a hydrogen tank 4 disposed behind the pressure bulkhead 3; and a pair of sub hydrogen tanks 43 disposed ahead of the pressure bulkhead 3. The pair of sub hydrogen tanks 43 are cylindrical tanks longer in the fuselage axis direction, and are disposed on the sides of the fuselage 110.

The difference from the above fifth embodiment is in a supporting structure of the sub hydrogen tanks 43. This point will be described with reference to FIG. 10. The main wings 120 are high wing type wings extending right and left from an upper part of the fuselage 110. The main wings 120 are supported by truss struts 121 extending obliquely upward from the fuselage 110. The engines 2 are supported under the wings of the main wings 120. By adopting a support structure using the truss struts 121, the bending loads at the bases of the main wings 120 with respect to the fuselage 110 can be reduced, and the structural efficiency of the whole of the airframe 10A can be increased. Furthermore, restriction conditions for thinning the main wings 120 can be relaxed, and the resistance of the whole of the airframe 10A can be reduced.

Figure 10:
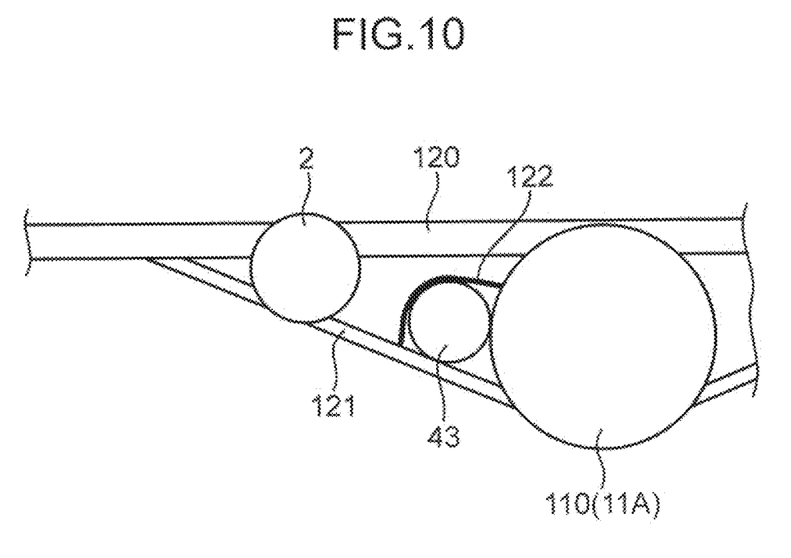
FIG. 10 is a cross-sectional view illustrating an installation state of a sub hydrogen tank of the hydrogen aircraft of the sixth embodiment.

The sub hydrogen tanks 43 are disposed under the wings of the main wings 120 and between the engines 2 and the fuselage 110 in the direction orthogonal, in a horizontal plane, to the fuselage axis. FIG. 10 illustrates an example in which the sub hydrogen tank 43 is disposed so as to be in contact with the side of the fuselage 110; however, the sub hydrogen tank 43 may be disposed apart from the fuselage 110. A periphery of the sub hydrogen tank 43 is covered with a fairing 122. The fairing 122 is a member that is smoothly connected to the truss strut 121 and the fuselage 110 to rectify an air flow for low drag. The sub hydrogen tank 43 may be disposed between the truss strut 121 and the main wing 120. In this case, the fairing 122 is structured to be smoothly connected to the main wing 120.

Other Embodiments

Although various embodiments of the present disclosure have been described above, the present disclosure is not limited to the above embodiments, and for example, the following embodiments can be adopted.

Figure 11:
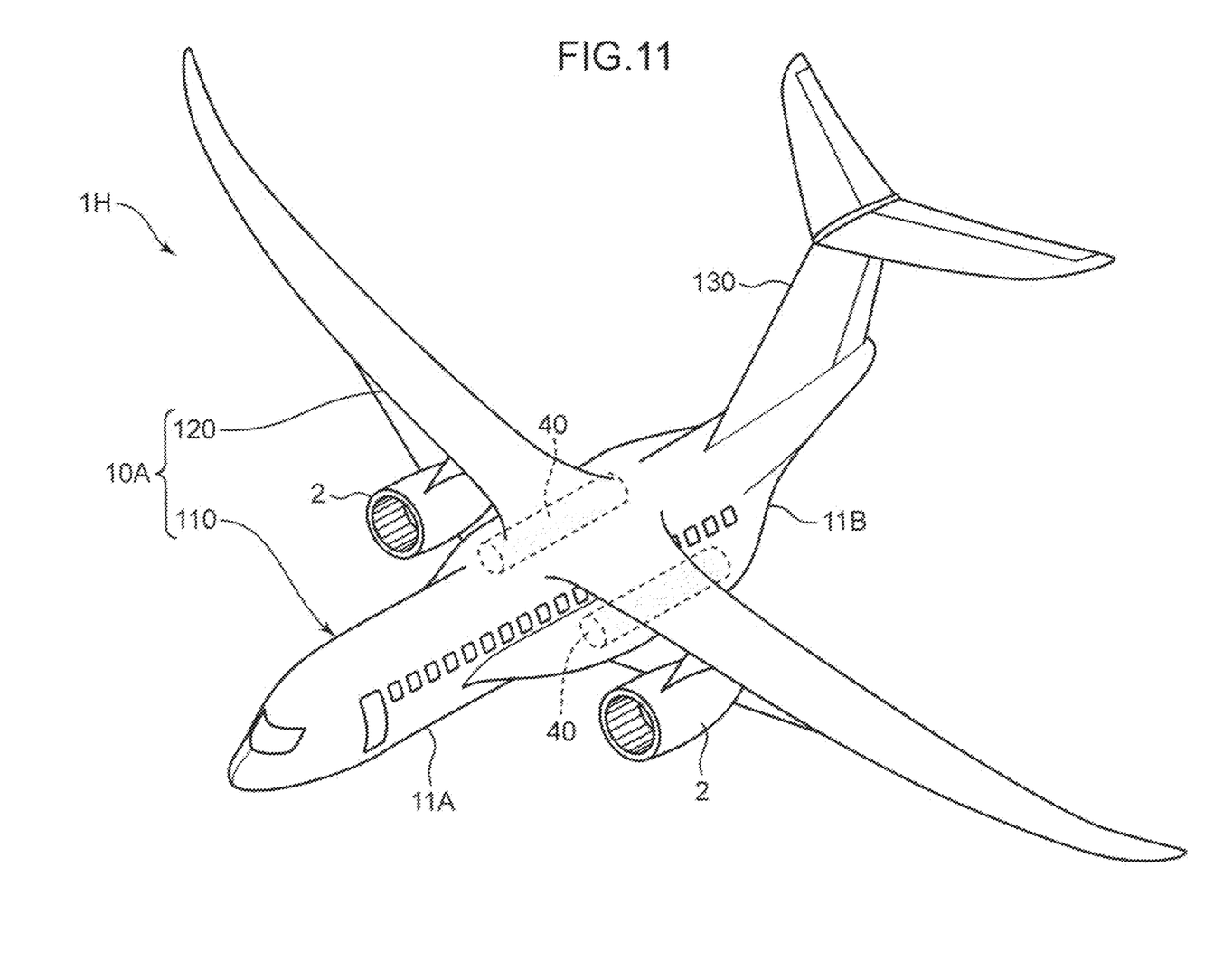
FIG. 11 is a perspective view illustrating an installation state of a hydrogen tank of a hydrogen aircraft according to another embodiment.

A hydrogen aircraft 1 has a fuselage configuration in which a plurality of hydrogen tanks 4 for storing liquid hydrogen are disposed to be elongated from the rear to the center of a fuselage 11 in the fuselage axis direction. As shown in FIG. 11, a hydrogen aircraft 1H has a fuselage configuration in which hydrogen tanks 40 are disposed on the sides of the fuselage 110 and on the lower surface of the main wings 120. The hydrogen aircraft 1H has a structure similar to that of the hydrogen aircraft 1G in FIG. 9, but is different in that the hydrogen aircraft 1H does not include the hydrogen tank 4 in the rear fuselage 11B.

A hydrogen aircraft 1 has a fuselage configuration in which a hydrogen tanks 4 are disposed on the sides of a fuselage 11 and on the upper surfaces of main wings 12.

The hydrogen tanks 4 are disposed above low wing type main wings 12 extending right and left from a lower part of the fuselage 11. A hydrogen aircraft 1 has a fuselage configuration in which a truss strut structure is adopted for main wings 12.

SUMMARY OF PRESENT DISCLOSURE

The specific embodiments described above include a disclosure having the following configurations.

A hydrogen aircraft according to a first aspect of the present disclosure includes: an airframe including a fuselage and a wing; at least one propulsion system fixed to the airframe; a pressurized chamber disposed inside the fuselage; a pressure bulkhead that is disposed at a rear part of the pressurized chamber and has strength to withstand pressurization of the pressurized chamber; a hydrogen tank that is disposed in an accommodation section and stores liquid hydrogen, the accommodation section being installed behind the pressure bulkhead, outside the pressurized chamber, and inside the fuselage; and a supply line that supplies the liquid hydrogen stored in the hydrogen tank to the propulsion system.

According to the first aspect, the hydrogen tank is disposed in the accommodation section installed behind the pressure bulkhead. That is, since the hydrogen tank is disposed in the non-pressurized space that is at a rear part of the fuselage and is isolated from the pressurized chamber by the pressure bulkhead, the degree of freedom of maintenance is improved. In addition, since the non-pressurized space is the internal space of a rear part of the fuselage, it is easy to secure a large tank capacity without increasing the cross-sectional area of the fuselage. Furthermore, since a form in which a plurality of tanks are provided on the outer periphery of the fuselage is not adopted, the hydrogen tanks do not have a form of being elongated in the fuselage axis direction, and the tanks can have a tank shape closer to a spherical shape. Therefore, the ratio of the tank surface area to the tank volume can be small, and the thermal insulation properties of the hydrogen tank can be easily improved. Therefore, it is possible to construct a hydrogen aircraft having a hydrogen tank having excellent maintainability and excellent thermal insulation properties.

A hydrogen aircraft according to a second aspect is configured such that, in the hydrogen aircraft according to the first aspect, the hydrogen tank is divided into at least two of a first hydrogen tank and a second hydrogen tank and is disposed in the accommodation section.

With the second aspect, since the hydrogen tank is divided into at least two parts, a disposition form of the hydrogen tank in the accommodation section can be diversified. Furthermore, it is easy to facilitate the access of a worker to the hydrogen tank and the attachment and detachment of the hydrogen tank to and from the accommodation section, and maintainability can be improved.

A hydrogen aircraft according to a third aspect is configured such that, in the hydrogen aircraft according to the second aspect, the first hydrogen tank and the second hydrogen tank are disposed in line in a front-rear direction of the fuselage.

With the third aspect, it is possible to improve maintainability while ensuring a large tank capacity by efficiently using the space of the accommodation section.

A hydrogen aircraft according to a fourth aspect includes, in the hydrogen aircraft according to the second aspect, as the wing a vertical empennage attached above the accommodation section, in which the fuselage includes a structural member that is disposed to vertically penetrate the accommodation section and supports the vertical empennage, and the first hydrogen tank and the second hydrogen tank are respectively disposed in a one side chamber and the other side chamber, the accommodation section being partitioned into the one side chamber and the other side chamber by the structural member.

With the fourth aspect, a vertical load acting on the vertical empennage can be transmitted to the fuselage through the vertical structural member disposed to penetrate the accommodation section. In addition, the first and second hydrogen tanks can be efficiently disposed using the side chambers generated by the disposition of the structural member.

A hydrogen aircraft according to a fifth aspect is configured such that, in the hydrogen aircraft according to any one of the first to fourth aspects, the fuselage includes an attachment and detachment mechanism that allows the hydrogen tank to be attached to and detached from the accommodation section.

With the fifth aspect, due to the attachment and detachment mechanism being equipped, it is easy to attach and detach the hydrogen tank to and from the accommodation section, and maintainability can be improved.

A hydrogen aircraft according to a sixth aspect is configured such that, in the hydrogen aircraft according to the fifth aspect, the attachment and detachment mechanism is a mechanism that allows a rear fuselage, of the fuselage, behind the pressure bulkhead to swing with respect to a part, of the fuselage, ahead of the rear fuselage such that the accommodation section is exposed.

With the sixth aspect, the accommodation section can be exposed by swinging the rear fuselage. Therefore, it is possible to facilitate access of a worker to the hydrogen tank, removal of the hydrogen tank from the accommodation section, assembly of the hydrogen tank to the accommodation section, and the like.

A Hydrogen aircraft according to a seventh aspect is configured such that, in the hydrogen aircraft according to the fifth aspect, the attachment and detachment mechanism is a mechanism that allows a peripheral wall of a rear fuselage, of the fuselage, behind the pressure bulkhead to be opened such that the accommodation section is exposed.

With the seventh aspect, the hydrogen tank in the accommodation section can be largely exposed by removing the peripheral wall of the rear fuselage, for example, a fairing. Therefore, accessibility to the hydrogen tank and attachability and detachability of the hydrogen tank can be improved.

A hydrogen aircraft according to an eighth aspect is further includes, in the hydrogen aircraft according the first to seventh aspects, a sub hydrogen tank attached to the airframe at a position ahead of the pressure bulkhead, the hydrogen tank having a tank shape longer in a fuselage axis direction.

With the eighth aspect, in addition to the hydrogen tank disposed behind the pressure bulkhead, the sub hydrogen tank is disposed ahead of the pressure bulkhead, whereby the weight balance can be achieved.

A hydrogen aircraft according to a ninth aspect is configured such that, in the hydrogen aircraft according to the first to eighth aspects, an access door to the hydrogen tank is provided on the fuselage, and the supply line is provided only at a place other than between the access door and the hydrogen tank.

With the ninth aspect, a worker only has to open the access door to access the hydrogen tank, and, in addition, the worker can perform maintenance work of the hydrogen tank without being obstructed by the supply line.

The invention claimed is:

1. A hydrogen aircraft comprising:
an airframe including a fuselage and a wing;
at least one propulsion system fixed to the airframe;
a pressurized chamber disposed inside the fuselage;
a pressure bulkhead that is disposed at a rear part of the pressurized chamber and has strength to withstand pressurization of the pressurized chamber;
a hydrogen tank that is disposed in an accommodation section and stores liquid hydrogen, the accommodation section being installed behind the pressure bulkhead, outside the pressurized chamber, and inside the fuselage; and
a supply line that supplies the liquid hydrogen stored in the hydrogen tank to the propulsion system, wherein the fuselage includes an attachment and detachment structure that allows the hydrogen tank to be attached to and detached from the accommodation section, and the attachment and detachment structure is a structure that allows a rear fuselage, of the fuselage, behind the pressure bulkhead to swing with respect to a part along an axis direction of the fuselage, ahead of the rear fuselage such that the accommodation section is exposed.

2. The hydrogen aircraft according to claim 1, wherein the hydrogen tank is divided into at least two of a first hydrogen tank and a second hydrogen tank and is disposed in the accommodation section.

3. The hydrogen aircraft according to claim 2, wherein the first hydrogen tank and the second hydrogen tank are disposed in line in a front-rear direction of the fuselage.

4. The hydrogen aircraft according to claim 1, further comprising a sub hydrogen tank attached to the airframe at a position ahead of the pressure bulkhead, the hydrogen tank having a tank shape longer in a fuselage axis direction.

* * * * *